(12) United States Patent
Kirkjan

(10) Patent No.: US 12,274,287 B2
(45) Date of Patent: *Apr. 15, 2025

(54) PRESSURIZED STEAM PITTING APPARATUS AND PROCESS

(71) Applicant: Desert Valley Date, Inc., Palm Desert, CA (US)

(72) Inventor: Gregory Paul Kirkjan, Palm Desert, CA (US)

(73) Assignee: Desert Valley Date, Inc., Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,055

(22) Filed: Apr. 12, 2021

(65) Prior Publication Data
US 2021/0329960 A1    Oct. 28, 2021

Related U.S. Application Data

(63) Continuation of application No. 16/196,441, filed on Nov. 20, 2018, now Pat. No. 10,973,252, which is a continuation of application No. 14/791,058, filed on Jul. 2, 2015, now Pat. No. 10,136,670.

(60) Provisional application No. 62/020,585, filed on Jul. 3, 2014.

(51) Int. Cl.
    *A23N 4/08* (2006.01)
    *A23L 19/00* (2016.01)
    *A23N 3/04* (2006.01)

(52) U.S. Cl.
    CPC ............... *A23N 4/08* (2013.01); *A23L 19/03* (2016.08); *A23N 3/04* (2013.01)

(58) Field of Classification Search
    CPC .. A47J 25/00; A23N 4/04; A23N 4/02; A23N 4/22; A23N 4/08; A23N 15/02; A23N 4/085; A23N 15/00; A23N 1/02; A23N 3/04; A23N 4/12
    See application file for complete search history.

(56) References Cited

U.S. PATENT DOCUMENTS

| 1,924,678 A | 8/1933 | Curtiss |
| 2,360,103 A | 10/1944 | Britten |
| 2,630,205 A | 3/1953 | Ashlock, Jr. |

(Continued)

OTHER PUBLICATIONS htlp//.www.merriam-webster.com/dictionary/end. retrieved online Dec. 6, 2017.

(Continued)

*Primary Examiner* — Hong T Yoo
(74) *Attorney, Agent, or Firm* — Knobbe, Martens, Olson & Bear, LLP

(57) ABSTRACT

In accordance with the teachings of the disclosure, a process is disclosed for pitting drupes. In some embodiments of a pitting process, the pitting machine uses a pitting knife that has a longitudinal passageway that extends axially through the pitting knife. The pitting machine has a steam source that provides pressurized steam to the passageway of the pitting knife. Prior to pitting the drupe, the pressurized steam flows through the passageway and onto a portion of a drupe positioned within a carrier in the pitting machine. The heat and pressure of the steam between the drupe and the cutting end of the cutting knife can soften a localized portion of the drupe so that the cutting knife can cut through the flesh of the drupe and eject the pit out of the opposite side of the drupe.

15 Claims, 6 Drawing Sheets

(56) References Cited

U.S. PATENT DOCUMENTS

| | | |
|---|---|---|
| 2,740,440 A | 4/1956 | Wright |
| 5,577,439 A | 11/1996 | Cimperman et al. |
| 5,992,310 A | 11/1999 | Castro |
| 6,410,069 B1 | 6/2002 | Castro |
| 8,955,427 B2 | 2/2015 | Gonzalez |
| 10,136,670 B2 | 11/2018 | Kirkjan |
| 10,973,252 B2 | 4/2021 | Kirkjan |

OTHER PUBLICATIONS https://www.merrian-webster.com/dictionary/face, retrieved online Apr. 12, 2018 (Year: 2018).

PRESSURIZED STEAM PITTING APPARATUS AND PROCESS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field

The disclosure relates to an apparatus for pitting a whole drupe with a pitting knife that removes the pit or stone from the body of the drupe. The term "drupe" refers to a fleshy fruit such as a plum, date, cherry or olive, usually having a single hard stone (or "pit") that encloses a seed.

Description of Related Art

Machines that automatically pit drupes make it possible for people to enjoy fruit, and vegetables without pits without requiring the pits to be removed manually, which would increase the cost significantly. In pitting machines, a pitting knife or an assembly of pitting knives in a pitting head, cuts through the skin and flesh of the drupe being pitted, ejects the stone, and is then retracted leaving a passage substantially in the center of the drupe.

Drupes will sometimes require pre-hydration to soften the flesh of the drupe prior to pitting. The pre-hydration allows the pitting knife to penetrate the fruit. Some drupes, such as dates, are naturally dry and hard. As such, the practice for pitting dates is to hydrate the dates for a period of time, such as a couple of hours up to a day prior to pitting the dates.

When drupes are pitted that are too hard, the pitting process can damage the drupes by splitting them with the pitting knife, which can make the drupes less appealing to the customer. Pitting hard drupes can damage the pitting knife over time, resulting in frequent replacement of the pitting knives and additional maintenance of the pitting machine.

In addition to the time that it takes to hydrate the drupes, hydrating drupes can cause the skin of the drupe to become too soft, resulting in drupes that can be more easily damaged by the pitting process, which can reduce the value of the drupes. The hydrated drupes can also leave a sticky residue on the cutting knives, which increases the maintenance required for the pitting knives and the pitting machine. After the hydrated dates are pitted, the drupes are generally dehydrated to a desired point prior to being post processed and sold to customers, which adds additional cost and processing time.

SUMMARY

In accordance with the teachings of the disclosure, a process is disclosed that remedies one or more of the problems associated with pitting drupes discussed above, thereby making the pitting process more efficient. In some embodiments of a pitting process, the pitting machine uses a pitting knife that has a longitudinal passageway that extends axially through the pitting knife. The pitting machine has a steam source that provides pressurized steam to the passageway of the pitting knife. The pressurized steam is pressurized above atmospheric pressure. Prior to pitting the drupe, the pressurized steam flows through the passageway and onto a top portion of a drupe positioned within a carrier in the pitting machine. The cutting end of the pitting knife can create a seal with the top portion of the drupe, which can cause the pressure to build. The heat and pressure of the steam between the drupe and the cutting end of the cutting knife can effectively act like a pressure cooker on the top portion of the drupe, which can accelerate the process of hydrating the drupe. Hydrating the drupe at the raised heat and pressure can soften the localized portion of the drupe so that the cutting knife can cut through the flesh of the drupe and eject the pit out of the opposite side of the drupe. In some embodiments, the drupe can receive pressurized steam from the bottom and pressurized steam on the top of the drupe. The pressure and temperature of the drupe can vary in accordance with the type of drupe being pitted. The drupe may not be hydrated prior to the drupe being placed in the pitting machine.

The pressurized steam allows the pitting knife to easily cut through the flesh of the drupe. In accordance with some embodiments the process can operate in stages, the pitting knife can be positioned for a brief period of time at or close to the apex of the drupe prior to initiating the pitting action in order to build pressure and steam between the pitting knife and the top portion of the drupe, which can soften the drupe prior to ejecting the pit from the drupe. Preferably, a seal is formed between the pitting knife and the drupe. The steam can also help keep the body of the cutting knife clean and reduce the amount of sticky residue that can accumulate on the body of the pitting knife, which can help reduce the amount of maintenance required to keep the pitting machine operating.

By pitting the unhydrated drupes with the help of pressurized steam, an entire step of the pitting process can be removed. In some instances, the drupe may no longer need to be hydrated prior to the pitting. After pitting, the drupe can be hydrated, if needed, to the correct hydration level prior to post processing and shipping rather than dehydrated. In some instances, the process can also improve the quality of the drupes because the steam can soften only a localized portion of the drupes, which can make the skin of the drupe less likely to peal off during the pitting process.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In accordance with the teachings of the present disclosure, a conventional pitting machine is disclosed. A conventional pitting machine holds each drupe in a chuck. The pitting machine can use a plurality of chucks aligned in a carrier or fruit holder. The plurality of carriers can be secured in a tray on a chain driven endless conveyor. A pitting head, positioned near one end of the conveyor is configured to position pitting knives downwardly. Each knife can be thrust into a drupe held in place by a chuck within the carrier. The knives can be in one to one correspondence with each drupe as the drupe passes the pitting head. The drupes can be pitted and the pits rejected. Each pitting knife can have a longitudinal passageway that extends out the cutting end of the pitting knives. The longitudinal passageway of the pitting knife can be in fluid communication with a steam delivery system. The steam can be delivered to a top portion of the drupes as the pitting knives move downwardly to pit the drupes. The pressurized steam can facilitate the pitting of the drupes by hydrating the skin and softening the drupes where the steam contacts the drupes.

Embodiments described herein describe embodiments that describe the pitting of drupes. The embodiments described herein can be used to pit any type of fleshy fruit such as, for example, a date, plum, cherry, olive, or any other type of fruit that has a hard stone, or pit.

Figure 1:
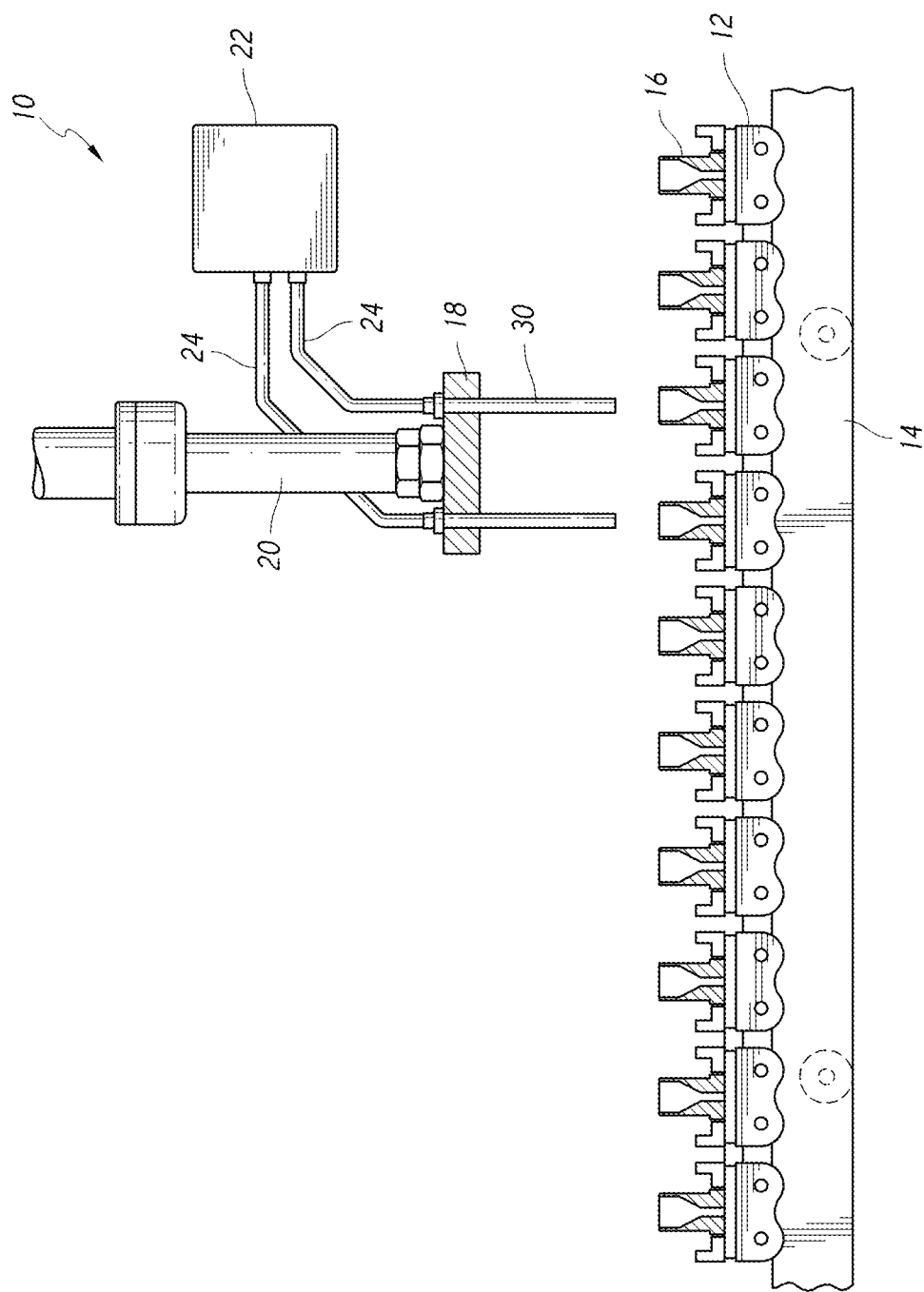
FIG. 1 illustrates an embodiment of a pitting machine with a pressurized steam system.

FIG. 1 illustrates an embodiment of a pitting machine 10. The pitting machine 10 includes an endless chain drive conveyor 12 carried within a frame 14. The pitting machine 10 can be configured with a control system (not shown) that controls the various components of the pitting machine 10, such as, the conveyor 12, the piston 20 or cam, and the steam system 22.

Secured on the conveyor 12 are a plurality of fruit carriers or holders 16. The fruit carriers 6 can have chucks, which are used to position a drupe within the carrier 16, typically with a major axis of the drupe on a vertical plane. One or more, including a plurality, of pitting knives 30 are secured to a pitting head 18. Each pitting knife 30 has an elongated body having a mounting end secured to the pitting head 18 and a pitting end that is configured to be thrust through a drupe and against the pit. The pitting knives 30 can push the pit out of the drupe and through a passage (not shown) below the carrier 16. The driving mechanism of the pitting machine 10 can be a piston 20 or other suitable mechanism and support structure that can provide the power sufficient to drive the pitting knives 30 through the drupes in order to remove the pits. In some embodiments, using the pressurized steam can require less force to pit a dry drupe than to pit a dry drupe that is not hydrated.

The pitting head 18 can be a plate or other suitable structure that is configured to secure one or more pitting knives 30 in position above the carriers 16. In the example shown two pitting knives 30 are illustrated. The pitting head 18 can be configured to secure one or more, including a plurality of pitting knives such as, 2, 4, 6, 10 or any number of pitting knives 30. For example, in one embodiment the pitting head 18 can be configured to hold eight pitting knives arranged in two rows, each row with four pitting knives 30. The arrangement of the pitting knives 30 within the pitting head 18 can be configured to match the arrangement of carriers 16 on the conveyor system 12.

The pitting machine 10 can be configured to have a loading mechanism (not shown) that is configured to sort and load the drupes on to the conveyor system 12 prior to pitting the drupes. Additionally the pitting machine 10 can have an unloading mechanism (not shown) that is configured to remove the pitted drupes from the conveyor system and process them.

The pitting machine 10 can also include a pressurized steam system 22 that is coupled to the pitting knives 30 via one or more conduits 24. The pressurized steam system 22 can provide pressurized steam to each of the pitting knives 30. The pressurized steam system can be configured to provide steam at various temperatures and pressures. In one embodiment, a boiler of the pressurized steam system can maintain the pressure at between 35 and 65 psi, between 40 and 60 psi, between 45 and 55 psi, between 45 and 50 psi, greater than 40 psi, less than 60 psi, and/or any combination of these recited ranges. The temperatures and pressures can vary based on the specific application of the pitting machine 10. The pressurized steam system 22 can provide a constant flow of steam through the pitting knives 30. The steam system can be configured to control the output of the flow of steam during the pitting process. For example, the steam system can actuate the steam at various stages in the pitting process for specific intervals of time. Generally, the steam is a combination of air and water vapor.

Figures 2, 3:
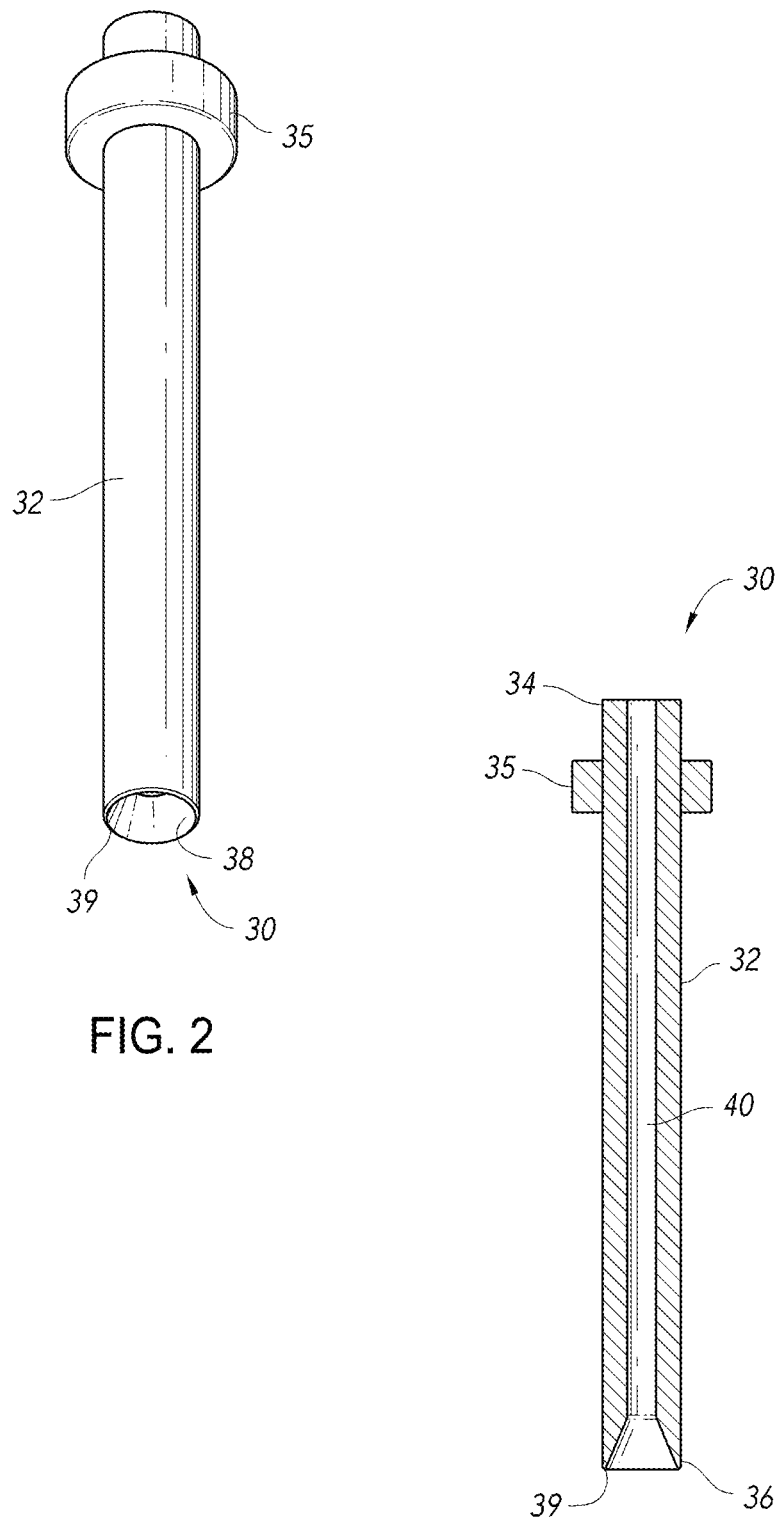
FIG. 2 illustrates an embodiment of a pitting knife.
FIG. 3 illustrates a cross section of the embodiment of the pitting knife from FIG. 2.

FIGS. 2 and 3 illustrate an embodiment of a pitting knife 30 for use with the pitting machine 10. FIG. 2 illustrates a perspective view of the pitting knife 30. FIG. 3 illustrates a cross-section of pitting knife 30. Each pitting knife 30 has an elongated body 32 having a mounting end 34 configured to be secured to the pitting head 18 and a pitting end 36. The mounting end 34 can have external threads configured to engage mating threads in the pitting head 18. A collar or portion 35 of the pitting knife 30 can be used to help secure and position the pitting knife 30 within the pitting head 18. In this embodiment, the collar 35 extends radially outward from the body 32. The collar 35 can act as a stop configured to correctly position the pitting knife within the pitting head 18. The cutting end 36 of the pitting knife 30 has a bottom cutting face 38 that is inwardly concave. The size and shape of the cutting face 38 is generally configured to engage the pit of the drupe. The periphery 39 of the bottom face can be sharpened to a knife edge, to facilitate cutting through each drupe. The geometry of the cutting face 38 can be generally circular as illustrated, however other geometries can be used.

The body 32 of the pitting knife 30 has a longitudinal passageway 40 that extends between the mounting end 34 and the cutting end 36. In this embodiment, the passageway 40 extends axially through the entire length of the body 32. It will be appreciated that the function of the longitudinal passageway 40 is unrelated to its location being axial, but for ease of manufacturing, the passageway 40 is axial. The passageway 40 of the cutting knife 30 is configured to be in fluid communication with the steam system 22 via a conduit 24 coupled to the mounting end 34. Due to ease of manufacturing the pitting knife 30 can be configured to have a fluid connection with the pressurized steam system at the connector end 34 of the pitting knife 30. The pressurized steam can enter the pitting knife 30 at any location along the length of the pitting knife 30, and not necessarily from the mounting end 34. In some embodiments the passageway 40 can have different configurations. For example, the passageway 40 can be configured to extend partially through the body 32 such that is does extend entirely to the mounting end 34. In such an embodiment, the passageway can have one or more inlets that extend radially outward from the passageway 40.

In one embodiment, the pitting knife is formed from stainless steel having an outside diameter of around 9 mm, and a length of about 12.5 cm. For different types of pitting machines, or different drupes, the pitting knife can have similar or different dimensions.

Figure 4A:
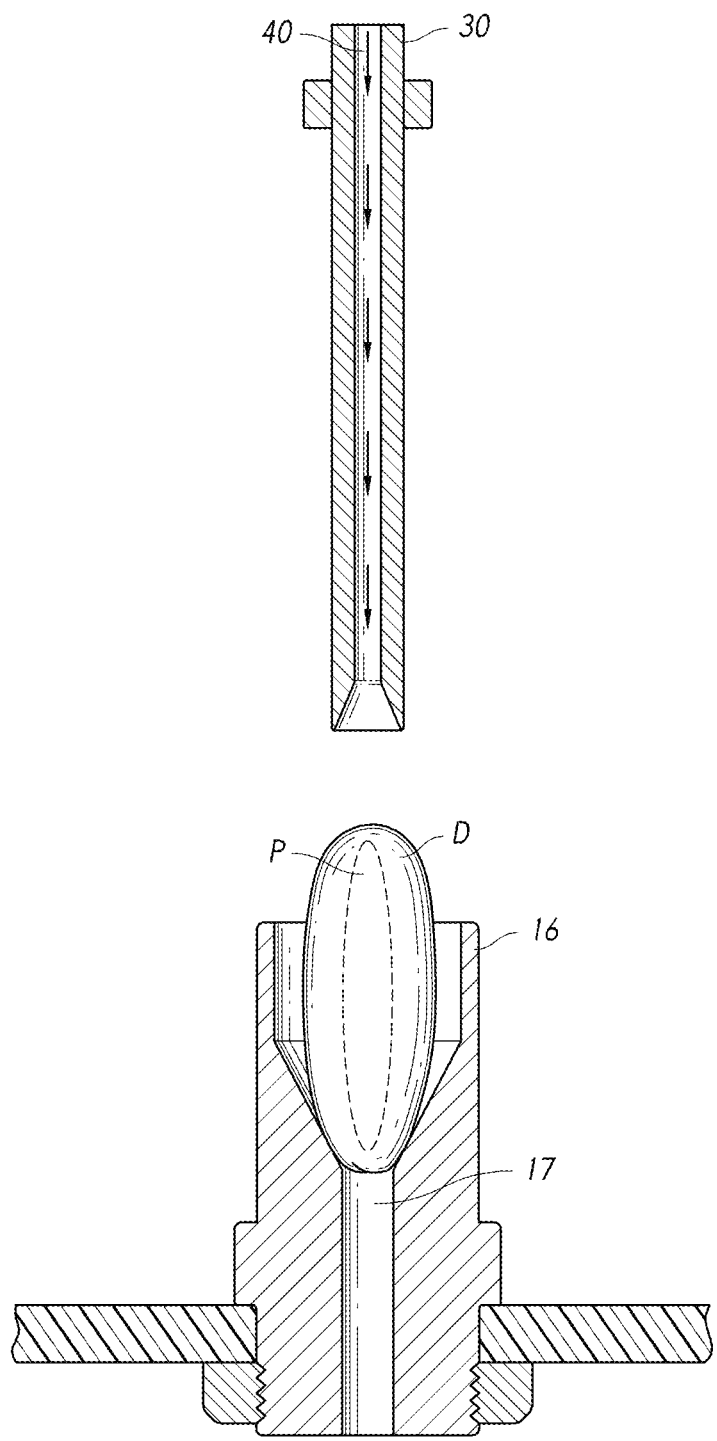
FIGS. 4A-4D illustrate an embodiment of the cross section of the pitting machine illustrating the process for pitting a drupe with a pressurized steam system.

FIGS. 4A-4D illustrate an embodiment of a process for pitting a drupe using the pitting machine 10 with pressurized steam. FIG. 4A illustrates a drupe D positioned longitudinally within a holder 16. The holder 16 has a channel 17 under the drupe D for ejection of the pit P. The pitting knife 30 is positioned above the drupe prior to the pitting operation. Preferably, the drupe is positioned with the pit along a generally vertical axis within the holder 16 such that when the cutting knife 30 is moved downwards the pitting knife 30 cuts through the drupe and contacts the pit in order to force the pit through the channel 17 without substantially harming the drupe in the process.

At the stage illustrated in FIG. 4A, the pressurized steam can be flowing through the passageway 40 of the pitting knife 30. The pressurized steam can be at a pressure that is greater than atmospheric pressure. The pressurized steam can be at a range of temperatures. For example, the temperature of the pressurized steam can be approximately 212° F. or greater. Generally, the steam can be a combination of air and water vapor.

Figure 4D:
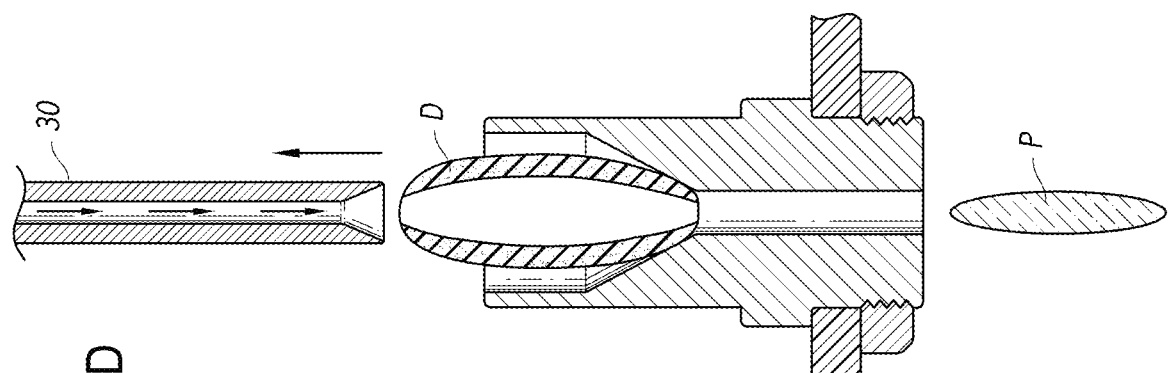
Figure 4C:
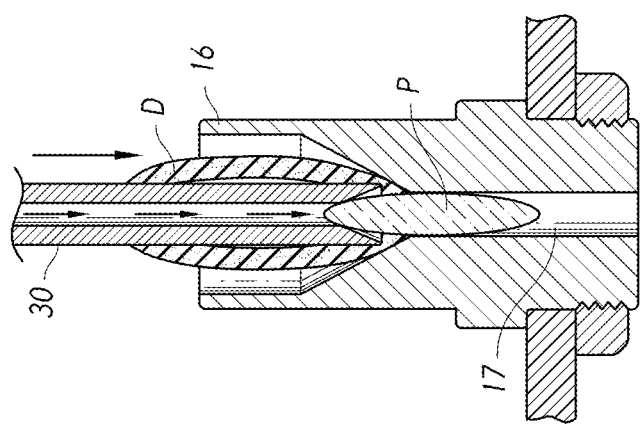
Figure 4B:
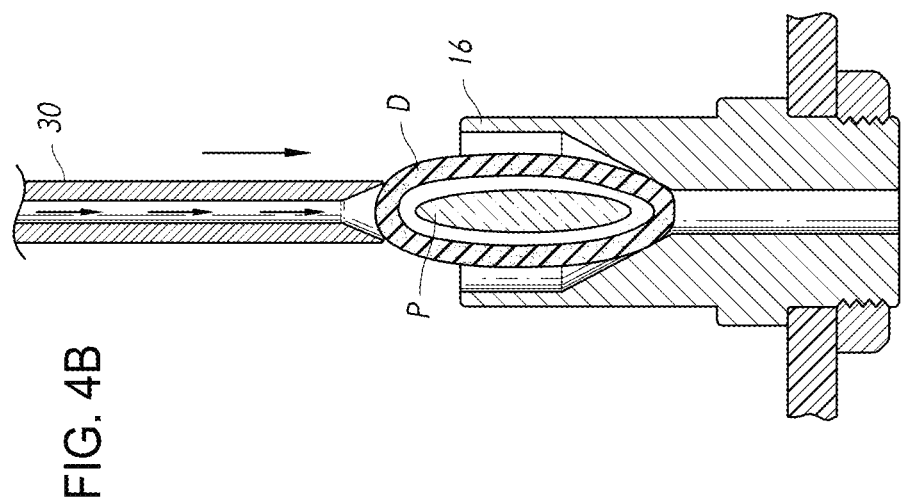

FIG. 4B illustrates the position of the pitting knife 30 after it has been moved downward from the position illustrated in FIG. 4A. The pitting knife 30 is positioned substantially at the top of the drupe. The cutting end 36 is positioned at the top and a portion of the drupe can be within the cutting end 36. As the cutting end 36 comes into contact with the top portion of the drupe, a seal can be formed between the pitting knife 30 and the drupe, which causes the pressure of the steam to build. The pressurized steam passes through the passageway 40 and can be applied to the top of the drupe. In some embodiments, the pressure of the steam can be between 35 and 65 psi, between 40 and 60 psi, between 45 and 55 psi, between 45 and 50 psi, greater than 40 psi, less than 60 psi, and/or any combination of these recited ranges. The increased pressure of the steam can accelerate the hydration of the top portion of the drupe, which can soften the drupe meat and skin. The softened meat and skin can be easier to penetrate and can allow the pitting knife 30 to cut through the meat of the drupe with less resistance. The steam can hydrate and heat up a portion of the top of the drupe. The hydration can happen quickly due to the heat and pressure of the steam at the top of the drupe. The steam can function to cook the drupe very quickly, thereby reducing the hardness of the drupe in a localized portion where the cutting end 36 comes in contact with the drupe.

The pitting knife 30 can be moved at a constant speed through the drupe. In some embodiments, the pitting knife 30 can accelerate as it moves through the drupe. In some embodiments, the speed of the pitting knife 30 can be controlled so that the pitting knife moves at different rates at different stages of the process. For example in some embodiments, the pitting knife 30 can be moved down to a certain position, such as the position shown in FIG. 4B. Preferably, the cutting end 36 is in contact with the drupe such that a seal can be formed between the pitting knife 30 and the drupe. In certain embodiments, the pitting knife 30 is held in that position for a certain amount of time prior to continuing to cut through the drupe, as illustrated in FIG. 4C. For example, the pitting knife 30 can be held in the position for greater than or equal to about 0.25 seconds, greater than or equal to about 2 seconds, greater than or equal to about 5 seconds, less than or equal to about 10 seconds, and/or any combination of the recited ranges. In some embodiments, the pitting knife 30 can move at a constant rate, a variable rate, in stages, or according to a program as determined or programmed by the control system based on a variety of factors such as the type of drupe, moisture content level of the drupe, the pressure of the steam, the temperature of the steam, the type of pitting machine, the geometry of the pitting knife, the rate of the conveyor system, or other user or system defined characteristics that can be used to set the rate at which the pitting knife moves through the stages of the pitting process. The chosen parameters can affect the efficacy of the pitting process based on balancing a variety of factors. For example, increasing the amount of time that a drupe is steamed can make it easier to pit the drupes, but can lower the throughput of the pitting machine and over-hydrate the drupe and turn it to mush. The time and pressure of the steam can be monitored and adjusted during the pitting process depending on the moisture or quality of the fruit.

FIG. 4C illustrates the pitting knife 30 after it has penetrated the skin of the drupe and is ejecting the pit through the passage 17. In this position, the cutting knife 30 can continue to channel steam through the passageway 40 of the pitting knife 30. In some instances, the steam can build pressure within the cavity of the drupe, which can cause the pit to be forcefully ejected from the bottom of the drupe.

The steam can help to prevent the buildup of drupe residue on the pitting knife 30. By pitting the drupe without first hydrating, the drupe is in a dryer state, which can help to reduce the amount of sticky residue within the drupe, which can reduce build up on the pitting knife 30. The steam can also help to lubricate the portions of cutting end 34 and body 32 of the pitting knife 30 that come in contact with the drupe, which can help reduce the buildup.

In some embodiments the pitting knife may be slowed or stopped within the drupe in order to provide steam to the inside of the drupe in order to hydrate the drupe from within. The steam can have the effect of hydrating the drupe from the inside of the drupe. By hydrating the drupe from the inside, the hydration process can be sped up as it can be more efficient to hydrate the drupe from within and can improve quality. In some embodiments the steam can be used to clean fracas from within drupes. For example, the cutting end 36 of the cutting knife 30 can be positioned substantially at the top of the drupe after the pit has been ejected and provide pressurized steam to the interior cavity of the drupe, to help eject fracas or other contaminants that are within the cavity of the drupe, out the opposite end of the drupe. This can help to increase quality of the drupes by reducing the amount of rejects that are added to the drupes provided to consumers.

FIG. 4D illustrates the pitting knife 30 after it has been removed from the drupe and the pit of the drupe has been ejected through the channel 17 to a pit collection area. In some embodiments, the steam can be turned off at this stage. In some embodiments, the steam is continuously provided through the channel regardless of the stage or position of the pitting knife 30. The upward rate at which the pitting knife is retracted from the drupe can be different that the downward rate that at which the pitting knife 30 is inserted into the drupe. The pitting knife 30 can be retracted to a certain position away from the expected position of the drupes. For example, the pitting knife 30 can be retracted to a position greater than or equal to about 1 cm higher than the expected highest position of the drupes, at least 2 cm higher, or any other determined position.

Figure 5:
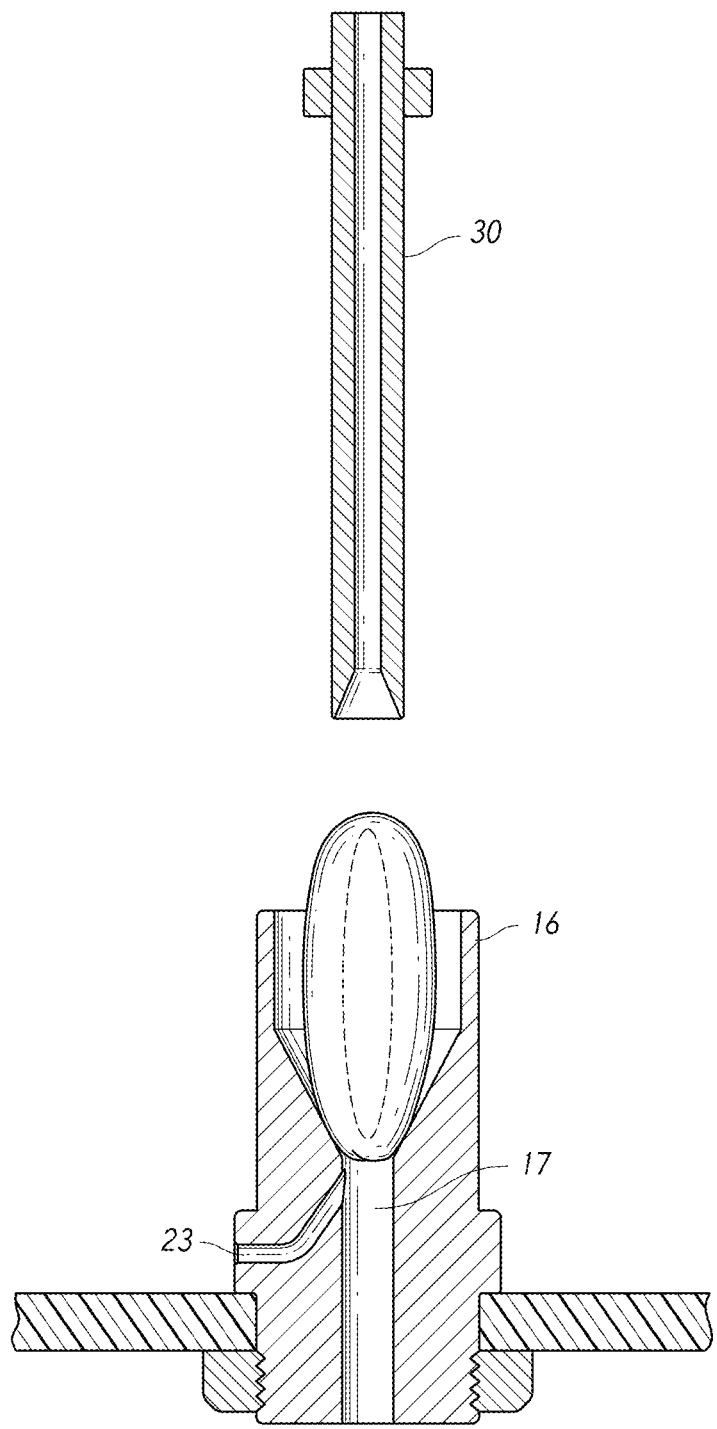
FIG. 5 illustrates an alternate embodiment of the pitting machine.

FIG. 5 illustrates an alternate embodiment of the pitting system 10 where an additional steam inlet 23 is provided in channel 17. The steam inlet 23 can be coupled to the pressurized steam system 22. The pressurized steam system 22 can provide pressurized steam to the pitting knives 30 and to the channel 17 below within the drupe holders 16. By providing pressurized steam to the bottom of the drupe, the bottom of the drupe can be softened in the same manner as the top of the drupe by the steam flowing through the pitting knife 30. By steaming the bottom end of the drupe, the drupe can be softened, which can reduce splitting of the drupe when the pit is ejected through the bottom of the drupe. For example, when the pitting knife cuts through the softened part of the drupe on top and forces the pit through the bottom of the drupe, the bottom of the drupe is still dry and hard which can in some instances, result in the drupe splitting.

The pressurized steam can be applied to the bottom of the drupe at the same time as the pressurized steam from the pitting knife 30. In some embodiments, the steam can be applied to the bottom prior to the drupe being positioned for pitting under a pitting knife 30. For example, the conveyor system 12 may have channels each connected to the pressurized steam system to provide pressurized steam to the bottom side of the drupe as the drupe is being moved along the conveyor system in the carrier 16. The steam that is provided to the bottom of the drupe can have the same or different characteristics as the steam that is provided through the pitting knife 30. For example, the steam provided by the pitting knife 30 can be of a specific pressure and temperature whereas the steam provided through the inlet 23 to the bottom of the drupe can be a different temperature and pressure.

In some embodiments the steam provided to the channel 17 can enter the channel through a side entry port 23 such as illustrated in FIG. 5. In some embodiments steam can enter through the bottom or another port through which the steam can provided to the channel 17. The control of the steam through the channel can be controlled by the control system such that the steam is provided to the channel for specified duration or period of time or position on the conveyor system. For example, the steam can be provided to the drupe as the holder 16 moves along the conveyer 12 from a first position to a second position, which can be independent of the time period in which steam is provided to the top side of the drupe.

Figure 6:
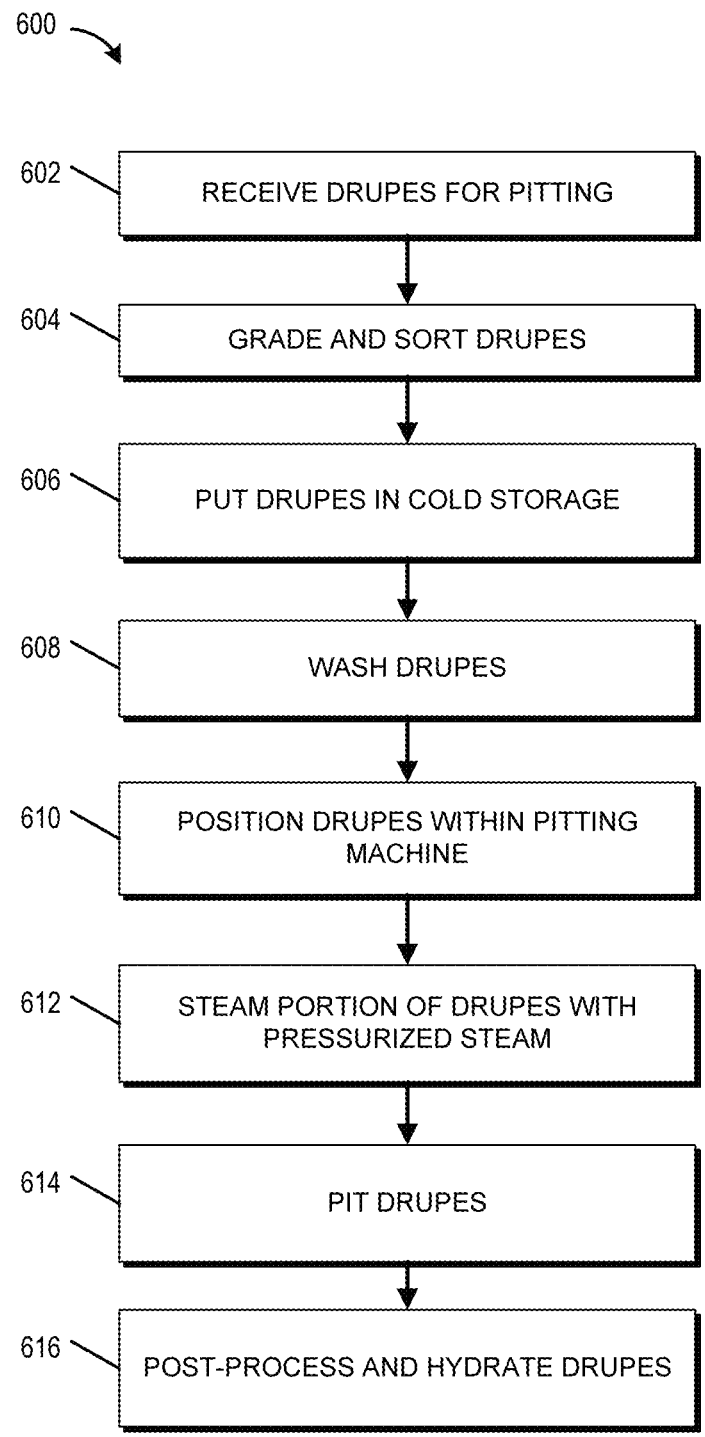
FIG. 6 illustrates an embodiment of a flow diagram of an illustrative process for processing and pitting drupes.

FIG. 6 illustrates a process for pitting drupes that can be performed by the pitting machine 10 using pressurized steam as discussed above. For example, the process could be used for pitting dates. At block 602 the drupes are received for pitting. At block 604 the drupes are visually graded and sorted. At this stage the drupes are sorted into industrial and consumer grade drupes. The drupes are then put into bins for storage. At block 606 the drupes are put into cold storage for a certain amount of time, such as, for example, one or more days, weeks, months, or years, after which at block 608 the drupes are washed prior to being pitted.

At block 610 the drupes are placed on the pitting machine within carriers. Generally, the drupes are positioned so that they are vertically aligned within the carriers. The alignment and positioning of drupes within the pitting machine is specific to the type of machine being used. For example, the positioning of the drupes within carriers of a plunger pitter system can be different than positioning within a rotary pitter system.

At block 612 the pressurized steam is applied to the drupes prior to being pitted by the pitting knives. The pressurized steam can flow through the pitting knife to a top portion of the drupe. The pressurized steam can soften and hydrate the top portion of the drupe prior to the pitting knife cutting through the drupe. In some embodiments the pressurized steam can be applied to the drupe for a set amount of time prior to the drupe being pitted by the pitting knife. For example the pitting knife can be moved into position at the top of the drupe and create a seal between the pitting knife and the top portion of the drupe for a certain amount of time, such as, for example, about 1 second, prior to entering and cutting through the drupe. The pressurized steam can be applied to a portion of the drupe, which softens the drupe and facilitates cutting through the drupe with the pitting knife. The pitting knife can provide pressurized steam as the pitting knife moves into the drupe at a determined rate, such as a constant rate.

At block 614, the drupes are pitted when the knife moves through the steamed portion of the drupe and forces the pit through the bottom of the drupe. In some embodiments pressurized steam is also applied to the bottom side of the drupe in order to hydrate and soften the bottom side of the drupe prior to the pit being forced through the bottom.

In some embodiments, pressurized steam can be applied to the top of the drupe prior to reaching the pitting knife. For example, the drupes can be conveyed to a steaming apparatus that steams the drupes prior to being conveyed to the pitting knives. The steaming apparatus can be positioned at a station within the conveying system such that it is positioned immediately prior to the pitting knives. The steaming apparatus can apply pressurized steam and then the pitting knife can pit the drupes. In some embodiments, the pitting knife can also apply pressurized steam to the drupe such that the drupe has a pre-steam phase and is steamed again when pitted by the pitting knife. In some embodiments, only the steaming apparatus steams the drupes and then a traditional pitting knife pits the drupes.

At block 616, the drupes are post processed and hydrated up to a desired hydration level depending on the specific demands or needs for the pitted drupes. In some embodiments, the hydration step can be partially performed by the pitting knives when the drupes are pitted, in which the drupes are hydrated from the inside out. Generally, the drupes are post processed and moved into bins or trays for hydrating prior to being packaged and shipped to a customer. In another embodiment the drupes could be hydrated in the conveyor line with a steam tunnel also referred to as a blancher, where steam can be applied to all the drupes at a specific humidity, pressure, temperature and duration, which can be controlled by the speed and length of the conveyor system. Depending on the hydration required for the drupes, the temperature water content and time that the drupes are within the steam tunnel can be controlled by a control system.

Embodiments have been described in connection with the accompanying drawings. However, it should be understood that the foregoing embodiments have been described at a level of detail to allow one of ordinary skill in the art to make and use the devices, systems, etc. described herein. A wide variety of variation is possible. Components, elements and/or steps may be altered, added, removed or rearranged. Additionally, processing steps may be added, removed or reordered. While certain embodiments have been explicitly described, other embodiments will also be apparent to those of ordinary skill in the art based on this disclosure.

Some aspects of the systems and methods described herein can advantageously be implemented using, for example, computer software, hardware, firmware or any combination of software, hardware and firmware. Software can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

While certain embodiments have been explicitly described, other embodiments will become apparent to those of ordinary skill in the art based on this disclosure. Therefore, the scope of the invention is intended to be defined by reference to the claims as ultimately published in one or more publications or issued in one or more patents and not simply with regard to the explicitly described embodiments.

What is claimed is:

1. A method for pitting a drupe, the method comprising:
   conveying a drupe within a carrier of a pitting machine;
   positioning a pitting knife above the carrier, the pitting knife having a longitudinal body with a first end and a cutting end, wherein a cutting face is disposed at the cutting end and a longitudinal passageway that is in fluid communication with a pressurized steam source, wherein the longitudinal passageway extends to an opening at the cutting face at the cutting end of the pitting knife;
   prior to pitting the drupe, applying pressurized steam to a top portion of the drupe, wherein the pressurized steam is provided by the pressurized steam source through the longitudinal passageway of the pitting knife to the opening at the cutting face of the pitting knife;
   moving the pitting knife through the drupe such that the pitting knife forces a pit of the drupe through an opposite side of the drupe; and
   retracting the pitting knife from the drupe.

2. The method of claim 1, wherein the pressurized steam is greater than atmospheric pressure.

3. The method of claim 1, wherein applying pressurized steam to the top portion of the drupe comprises positioning the pitting knife at a position above the carrier and holding the pitting knife in the position for an amount of time.

4. The method of claim 3, wherein the position is based on an expected position of a top portion of the drupe.

5. The method of claim 1 further comprising applying pressurized steam to a bottom portion of the drupe through a channel in the carrier prior to moving the pitting knife through the drupe.

6. The method of claim 5, wherein the pressurized steam applied to the top portion of the drupe has a different temperature and pressure then the pressurized steam applied to the bottom portion of the drupe.

7. The method of claim 1 further comprising holding the pitting knife within the drupe for an amount of time greater than or equal to about 0.25 seconds to provide pressurized steam to an inside of the drupe prior to retracting the pitting knife from the drupe.

8. The method of claim 1, wherein the drupe is a date.

9. A method for pitting a drupe, the method comprising:
   conveying a drupe along a conveyor system to at least a first pitting knife, the drupe being positioned within a carrier on the conveyor system, the first pitting knife having a longitudinal body with a first end and a cutting end, wherein a cutting face is disposed at the cutting end;
   prior to pitting the drupe, applying pressurized steam to a top portion of the drupe through an opening in the cutting face at the cutting end of the first pitting knife, wherein the pressurized steam has a supply pressure greater than atmospheric pressure;
   moving the first pitting knife through the top portion of the drupe to which the pressurized steam was applied such that a pit of the drupe is forced out of an opposite side of the drupe, wherein the first pitting knife penetrates the top portion of the drupe; and
   retracting the first pitting knife from the drupe.

10. The method of claim 9, wherein the pressurized steam is applied to the drupe through a longitudinal passageway in the first pitting knife.

11. The method of claim 9 further comprising applying pressurized steam to a bottom portion of the drupe through a channel in the carrier.

12. The method of claim 9, wherein the pressure is between 35 and 65 psi.

13. The method of claim 9, wherein the first pitting knife is moved longitudinally through the drupe.

14. The method of claim 9, wherein moving the first pitting knife through the top portion of the drupe is performed at a constant speed.

15. The method of claim 9, wherein moving the first pitting knife through the top portion of the drupe is performed at a variable speed.

* * * * *